United States Patent
Huang et al.

(10) Patent No.: US 9,631,644 B2
(45) Date of Patent: Apr. 25, 2017

(54) MODULAR COMBINED ELECTRO-HYDRAULIC MULTI-WAY VALVE SYSTEM USING COMPACT TWO-WAY CARTRIDGE VALVES

(71) Applicant: Shanghai Renhao Hydraulic Technology Co., Ltd., Shanghai (CN)

(72) Inventors: Renhao Huang, Shanghai (CN); Jun Gu, Shanghai (CN); Canxing Sun, Shanghai (CN); Shenqi Lou, Shanghai (CN)

(73) Assignee: SHANGHAI RENHAO HYDRAULIC TECHNOLOGY CO., LTD., Shanghai (CN)

( * ) Notice: Subject to any disclaimer, the term of this patent is extended or adjusted under 35 U.S.C. 154(b) by 14 days.

(21) Appl. No.: 14/431,802

(22) PCT Filed: Aug. 13, 2013

(86) PCT No.: PCT/CN2013/081419
§ 371 (c)(1),
(2) Date: Mar. 27, 2015

(87) PCT Pub. No.: WO2014/048181
PCT Pub. Date: Apr. 3, 2014

(65) Prior Publication Data
US 2015/0267720 A1 Sep. 24, 2015

(30) Foreign Application Priority Data
Sep. 28, 2012 (CN) .......................... 2012 1 0376577

(51) Int. Cl.
*F16K 31/12* (2006.01)
*F15B 13/08* (2006.01)
(Continued)

(52) U.S. Cl.
CPC ........ *F15B 13/0835* (2013.01); *F15B 11/006* (2013.01); *F15B 13/0417* (2013.01);
(Continued)

(58) Field of Classification Search
CPC  F15B 13/0835; F15B 13/0417; F15B 11/006; F16K 11/10; F16K 31/02; F16K 31/12
See application file for complete search history.

(56) References Cited

U.S. PATENT DOCUMENTS 3,589,387 A * 6/1971 Raymond ........... F15B 13/0817
137/261
4,359,064 A * 11/1982 Kimble ............... F15B 13/0817
137/269
(Continued)

FOREIGN PATENT DOCUMENTS

CN    WO 2010099699    *  9/2010  ............ F15B 13/043

*Primary Examiner* — Craig Schneider
*Assistant Examiner* — Kevin Barss
(74) *Attorney, Agent, or Firm* — John P. White; Cooper & Dunham LLP

(57) ABSTRACT

The invention is to provide a modular combined electro-hydraulic multi-way valve system using compact two-way cartridge valves. Two sets of seat valve main stages including two compact two-way cartridge valves separately are used to control two reversible controlled cavities, a cartridge pressure compensation control assembly is used to control load compensation, and valve body forms the main part of electro-hydraulic multi-way valve; The main body has the function of self-supply-oil pilot control by two side flange control plates; The main part of electro-hydraulic multi-way valve, side flange control plates, pilot stages and auxiliaries combine sandwich self-supply-oil high-voltage electro-hydraulic multi-way valve reversing league with four main ports P, T, A, B and multiple control ports Pc, Tc, Ls and auxiliary ports; The system can satisfy the requirements of higher efficiency, energy saving, low emission and diversity (Continued)

raised by equipment manufacturers through more kinds and more reasonable modular combined configurable solutions.

16 Claims, 11 Drawing Sheets

(51) Int. Cl.
    *F15B 11/00*      (2006.01)
    *F15B 13/04*      (2006.01)
    *F16K 11/10*      (2006.01)
    *F16K 31/02*      (2006.01)

(52) U.S. Cl.
    CPC .............. *F16K 11/10* (2013.01); *F16K 31/02* (2013.01); *F16K 31/12* (2013.01); *F15B 13/0839* (2013.01); *Y10T 137/7754* (2015.04)

(56) References Cited

U.S. PATENT DOCUMENTS 5,975,134 A * 11/1999 Schwelm .............. F15B 11/006
                                                  137/596.15
2012/0024406 A1* 2/2012 Huang .................. F15B 13/043
                                                  137/625

* cited by examiner

MODULAR COMBINED ELECTRO-HYDRAULIC MULTI-WAY VALVE SYSTEM USING COMPACT TWO-WAY CARTRIDGE VALVES

CROSS-REFERENCE TO RELATED APPLICATIONS

This application is a §371 national stage of PCT International Application No. PCT/CN2013/081419, filed Aug. 13, 2013, claiming priority of Chinese Patent Application No. 201210376577.3, filed Sep. 28, 2012, the contents of each of which are hereby incorporated by reference in their entirety.

TECHNICAL FIELD

The present invention relates to a new type of modular combined high-voltage electro-hydraulic multi-way valve (system) in hydraulic transmission and control field. Particularly, it is a modular combined high-voltage electro-hydraulic multi-way valve and system with the function of self-supply-oil pilot control and pressure compensation using compact two-way cartridge valves.

BACKGROUND

The multi-way valves and systems are used to control the direction, pressure and flow of hydraulic fluid, which are widely applicable to hydraulic control systems of mobile mechanisms, and significantly influence displacement, rotation, lifting and lowering and other ancillary functions of mobile equipments and transmission mechanisms. So the valves and systems are in the very important and remarkable status.

The traditional multi-way valve products can date from the manual directional valve in industrial hydraulic valves. The structure of them are the combinations of cylinder spool valve main stage with convex shoulders and throttles and complicated casting flow channel valve body with undercutting grooves and throttle ports. In the structure, the ratio of the length and the diameter of cylinder spool valve main stage is excessive, the dimensional accuracy and geometric tolerance is very strict, the throttles are too many and with kinds of shapes, the ratio of the length and the diameter of the valve hole in the complicated casting flow channel valve body is more excessive, the fit between valve hole and spool and the dimensional accuracy and geometric tolerance of related dimensions are much stricter, the axial and circumferential fit between convex shoulders and spool throttles are more complicated. Therefore, the machining of the structure is complicated, the structure is incompliant, the cleanliness and temperature of the oil is hard to control, the structure is very sensitive to the mechanical deformation and this will usually lead to spool seizure and influence use and maintenance. The screw cartridge valves and other "single control elements" and auxiliary elements with embedded structure are widely used in the valve body to combine valve system products with combined functions. This will inevitably increase the number of elements and mounting holes and cause structure redundancy. In control principle, the reciprocating spool main stage of multi-way valve is similar to reversing valve of industrial hydraulic valve, which can control direction and flow by controlling and changing flow area and characteristic of four throttle ports through the changes of axial relative place between cylinder spool convex shoulders and throttle ports. The reciprocating movement of spool main stage can be manual control, hydraulic control, pneumatic control, electronic control, electro-hydraulic control, electro-hydraulic proportional control and so on. The principle is a linkage control solution, which makes two controlled chambers of actuator with double loaded cavities rigid synchronous. Therefore, the single controllability of throttle ports is not good enough and cannot satisfy more and more diversified control requirements of throttle ports, especially different configurations of cylinder structure parameters (rod diameter area, differential ratio and so on) for different loaded requirements. This inevitably causes very complicated configurations not only before factory, but also in field. This will make optimization more complicated and difficult.

FIG. 1 is a structure diagram of a commercially available typical multi-way valve product. In FIG. 1, the structure consists of the cylinder spool 1-1-2 with multiple convex shoulders and kinds of circumferential throttle ports and complicated valve body 1-1-1 with multiple undercutting grooves and inner channels and four channels of main ports. There are multiple auxiliary control valves and corresponding mounting holes using screw cartridge valves in valve body, such as the relieve valve 1-1-5 with second-supply-oil function, the pressure compensation valve 1-1-3 with load sensing, the embedded check valve 1-1-4 and corresponding mounting holes. End plates 1-1-6 on both sides of spool 1-1-2 can import oil from outside pilot control system and install mechanism 1-1-7, which can restrict and adjust axial position of spool. This kind of traditional structural products is still at main stream and dominant position currently.

But in recent years, the requirements for hydraulic technology in mobile mechanisms are increasing with each passing day, the requirements for the traditional structure and the way of control are stricter, especially the requirements for spool main stage and valve body are more complicated, which make the complicated machining, structural compliance, single controllability and sensitive factor more prominent. Moreover, the current mobile machinery electro-hydraulic transmission chain faces extraordinary pressure of improving energy efficiency and reducing carbon emissions, which mean higher efficiency of mobile hydraulic transmission and control, more stricter emission standards of host machine, further improving intelligent control and overall coordinated engine energy efficiency. This kind of structure and control of the traditional multi-way valve in FIG. 1 cannot meet the requirements of application and currently faces new challenges and innovations.

Based on the new technical environment and background, the present invention proposes a new technical solution, in FIG. 2-1. The technical solution has carried on product reorganizations and structural innovations substantially for traditional multi-way valve in FIG. 1 from the main structure of valve, circuit control and so on. The innovative modular combined high-voltage electro-hydraulic multi-way valve and system with the function of self-supply-oil pilot control using compact two-way cartridge valves, not only can satisfy the basic control functions of traditional electro-hydraulic valve system and be two connection ways including sandwich and monoblock, but also can satisfy the requirements of higher efficiency, energy saving, lower emission through more kinds and more reasonable modular combined configurable solutions. And the requirements of geometric structure based on seat valve main stage, tolerance matching and precision grade of dimension, the heat treatments of materials and processing inspective technology, and the finish machining of special throttle ports are much less strict than the traditional structure. Especially, it has better "single controllability" for the control. From the above, it overall improves the space of "manufacturability", "assemblability", "maintainability". Therefore, it has avoided structural defect of difficult to manufacture because of complicated structure and incompliant structure and is good for the changing of manufacturing mode from the traditional way to the mass customized way. It will significantly and positively influence the development of mobile hydraulic control valve and combinations.

SUMMERY OF THE INVENTION

Through modern way of product design and new technical principal, the present invention can overall replace and realign traditional multi-way valve products, which are currently the mainstream in the field of mobile equipments.

To solve the problems, the technical solution of the invention is shown as follows:

The modular combined high-voltage electro-a modular combined high-voltage electro-hydraulic multi-way valve using compact two-way cartridge valves consists of two seat valve main stages including four compact two-way cartridge valves, which are used to control two reversible controlled cavities, a cartridge pressure compensation control assembly which is used to control load compensation, they and the valve body form the main part of electro-hydraulic multi-way valve, which has the function of self-supply-oil pilot control by two side flange control plates. The main part of electro-hydraulic multi-way valve, side flange control plates, pilot stages and other auxiliaries combines sandwich self-supply-oil high-voltage electro-hydraulic multi-way valve reversing league with four main ports P, T, A, B and multiple control ports Pc, Tc, Ls and other auxiliary ports. The outer main ports are connected to power and working machinery;

The main part of electro-hydraulic multi-way reversing league includes two seat valve main stages that are four symmetric placed and configurable compact two-way cartridge valves with two main ports. The two seat valve main stages form the four controllable main ports of electro-hydraulic multi-way valve;

There are mounting holes for four symmetric placed two-way cartridge valves and the independent cartridge valve mounting holes or screw mounting holes in the valve body of reversing league;

The flange control plates are used to connect and control the symmetric placed four seat valve main stages in the main part of electro-hydraulic multi-way reversing league;

The pressure compensation assembly in the main part of reversing league can be two-way or three-way type;

The pressure compensation assembly in the main part of reversing league can be direct acting control;

The pressure compensation assembly in the main part of reversing league can be pilot control;

The pressure compensation assembly in the main part of reversing league can prior be compact two-way cartridge valve pressure compensation assembly with combined flange control plate;

The pressure compensation assembly in the main part of reversing league can be structure with screw cartridge valve mounting holes or other mounting holes;

The pressure compensation assembly in the main part of reversing league can preset pilot control elements and control channels used to control pressure compensation in the two side flange control plates;

The valve body of reversing league is a complicated polyhedron using sandwich type;

The side flange control plate body of reversing league is a polyhedron. The preset more bolt holes in the flange control plate body are used to connect and seal the two sides mounting surfaces of the valve body through inner hexagon fastening bolts. The side flange control plates are used to connect and fix and seal the side seat valve main stages in the upper of the valve body. There can be preset multiple mounting holes for control plates. There can be mounting holes for pilot control elements used to control the two seat valve main stages in the bottom of the valve body and corresponding channels, which are in parallel with the side surface of the valve body in the lower of the plate body.

The upper of two side flange control plates are symmetrical. The pilot solenoid valve using screw mounting holes can be set on the plates.

The upper of the two side flange control plate are set with 2/4 pilot control valves.

The upper of one side flange control plate is set with 3/4 pilot control valves.

The seat valve main stages in the main part of reversing league are proportional control seat valve main stages, the two side flange control plate body can have pilot control stage which is corresponding with proportional control seat valve main stages.

The two side flange control plates are configurable flange control plates. In the configurable control plates there are mounting holes and control channels.

In the layout of four main stages of seat valve, the axes of the same side two seat valve main stages are parallel.

The valve body and the channels in the valve body are all using casting process.

The electro-hydraulic multi-way valve system consists of multiple sandwich electro-hydraulic reversing leagues.

The benefits or advantages: he present invention has carried on product reorganizations and structural innovations substantially for traditional multi-way valve in FIG. 1 from the main structure of valve, circuit control and so on. The innovative modular combined high-voltage electro-hydraulic multi-way valve and system with the function of self-supply-oil pilot control using compact two-way cartridge valves, not only can satisfy the basic control functions and connection ways of traditional electro-hydraulic valve system, but also can satisfy the requirements of higher efficiency, energy saving, lower emission through more kinds and more reasonable modular combined configurable solutions. At the same time, it has avoided structural defect of difficult to manufacture because of complicated structure through better "manufacturability", "assemblability", "maintainability" and is good for the changing of manufacturing mode from the traditional way to the mass customized way. It will significantly and positively influence the development of mobile hydraulic control valve and combinations. This invention can widely be used in kinds of mobile machines and equipments, including hoisting, road machinery, digging machinery, concrete machinery, piling machinery, and so on. That can also be applied in shipping, port, marine and military machines and equipments.

FIGURE BRIEF DESCRIPTION

FIG. 1 is a structural schematic of a typical traditional electro-hydraulic multi-way valve.

FIG. 2-1 is a structural schematic of a sandwich modular combined high-voltage electro-hydraulic multi-way valve using compact two-way cartridge valves with self-supply-oil pilot control functions. (The valve has the function of load-locking, 4/4 with the differential flow regeneration, adjustable A and B with throttles, adjustable oil return back pressure, and with the function of secondary oil compensating).

FIG. 2-2 is a schematic of electro-hydraulic multi-way valve in FIG. 2-1. The valve can be controlled by computer, circuit or manually. It can be connected by CAN.

FIG. 3-1 is a shape schematic of the electro-hydraulic multi-way valve with side flange control plates using two 3/2 compact screw cartridge valves as pilot control valves. It makes the valve have function of 4/4.

FIG. 3-2 is a shape schematic of the electro-hydraulic multi-way valve with side flange control plates using one or two 4/2 plated connected micro pilot solenoid valves as pilot control valves. It makes the valve have function of 2/4 or 4/4.

FIG. 3-3 is a shape schematic of the electro-hydraulic multi-way valve with left side flange control plate using plated connected micro pilot manually reversing valves. It makes the valve have function of 3/4.

FIG. 3-4 is a shape schematic of the electro-hydraulic multi-way valve with right side flange control plate using two 3/2 compact screw cartridge valves based on the valve in FIG. 3-1. It makes the valve have function of 4/4, and have the function of differential flow regeneration.

FIG. 3-5 is a shape schematic of the electro-hydraulic multi-way valve with A, B inlet proportional throttle control and return-oil pressure control functions.

FIG. 3-6 is a shape schematic of the electro-hydraulic multi-way valve with right side flange control plate using plated connected micro 3/4 pilot manually reversing valves. It makes the valve have function of 3/4.

FIG. 4-1 is a shape schematic of the sandwich modular combined high-voltage electro-hydraulic multi-way valve system using compact two-way cartridge valves. (Three pieces of electro-hydraulic reversing league in FIG. 4-1).

FIG. 4-2 is a schematic of the sandwich modular combined electro-hydraulic multi-way valve using compact two-way cartridge valves.

FIG. 4-3 is a shape schematic of the monoblock modular combined high-voltage electro-hydraulic multi-way valve system using compact two-way cartridge valves.

FIG. 5-1 is a structural schematic of the sandwich modular combined electro-hydraulic multi-way valve using the valve body in FIG. 5-1 and the compact two-way control assembly with combined flange control plates.

FIG. 5-2 is a schematic of the valve body using the mounting holes with parallel axes and casting process.

FIG. 5-3 is a structural schematic of the sandwich modular combined electro-hydraulic multi-way valve using the valve body in FIG. 5-2 and the compact two-way control assembly with combined flange control plates.

DETAILED DESCRIPTION OF THE EMBODIMENT

A modular configurable seat valve main stage structure using multiple compact two-way cartridge valves, a modular variant-design valve body using multiple new type of two-way cartridge valve mounting holes and two flange control plates with multiple innovative pilot control elements consists of a modular combined integral control valve and system, which can be sandwich or monoblock electro-hydraulic multi-way valve reversing league with four main ports, multiple pilot control ports and auxiliary ports. The new product solution has technical characteristics such as seat valve main stage, pilot control, cartridge connection and modular integral intelligent control. In control principal, they use the combination and transformation of independent resistance control solution of single element, which can be seen in FIG. 2-2. Therefore, through the new technical solution and principal, they can not only maintain the basic functions of traditional multi-way valve, but also can further expand and optimize more and more technical advantages and potentials for customers' application and cooperate to achieve new development of mobile hydraulics.

Figure 1:
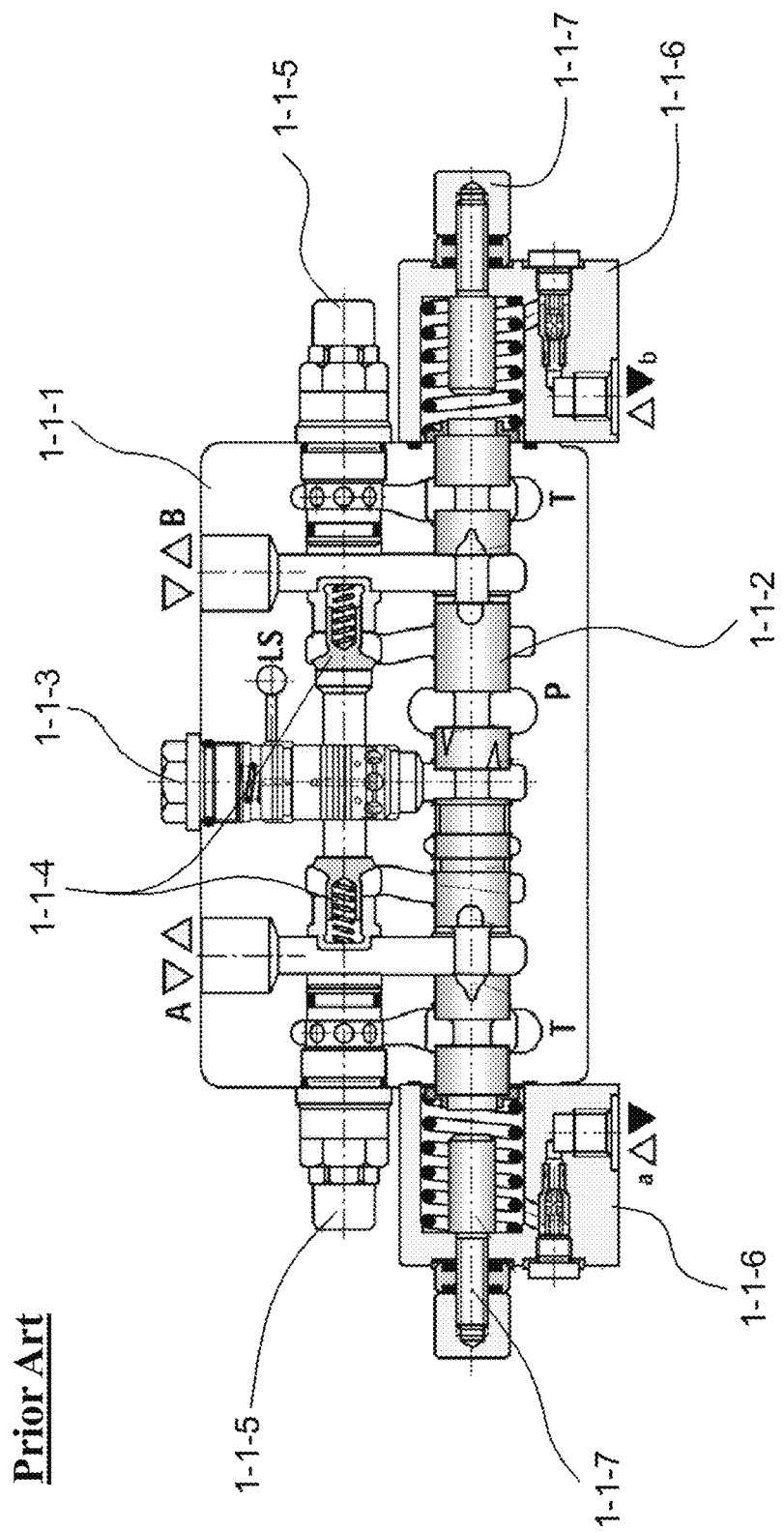
Figures 1, 2:
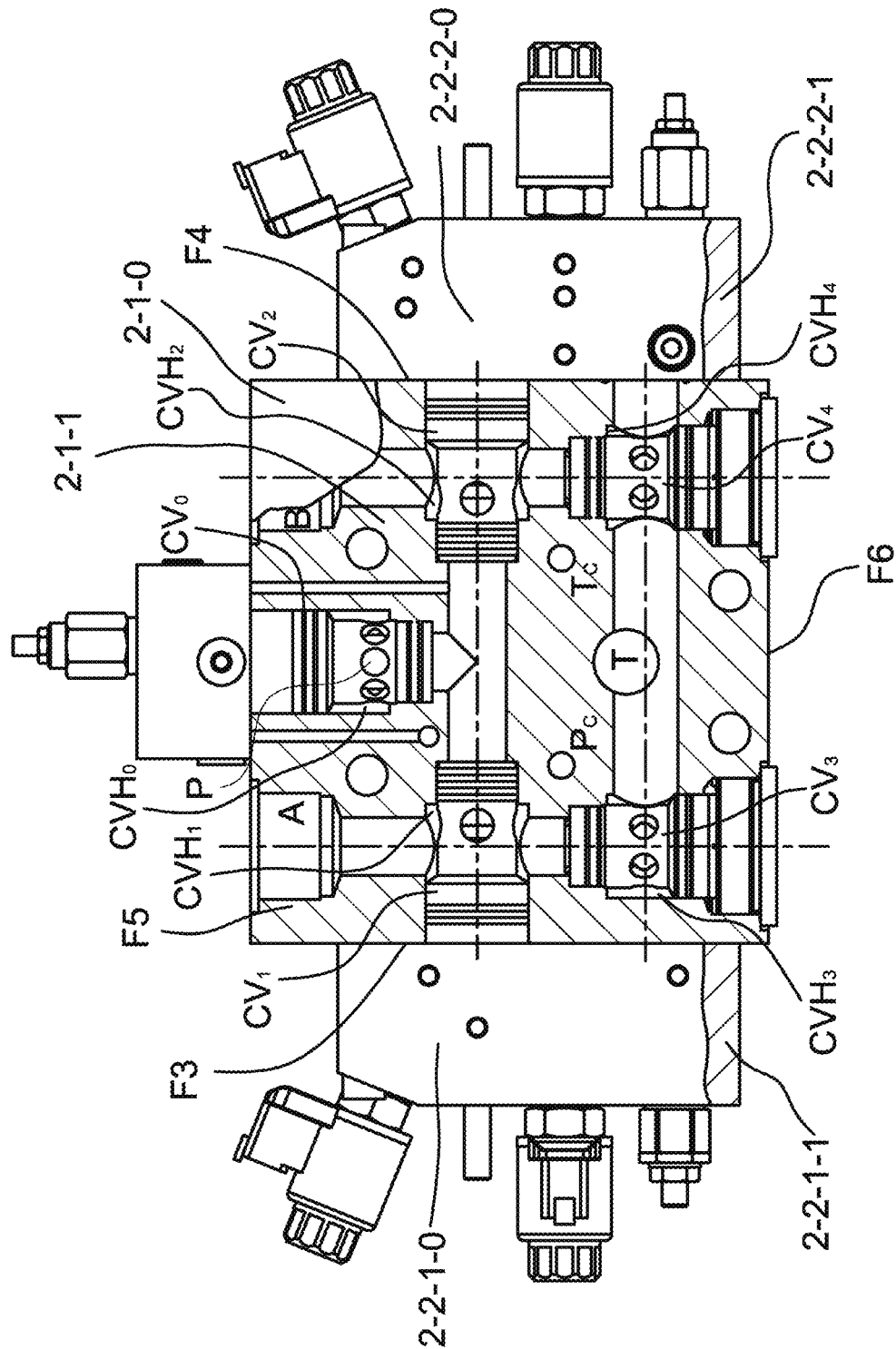
Figure 2:
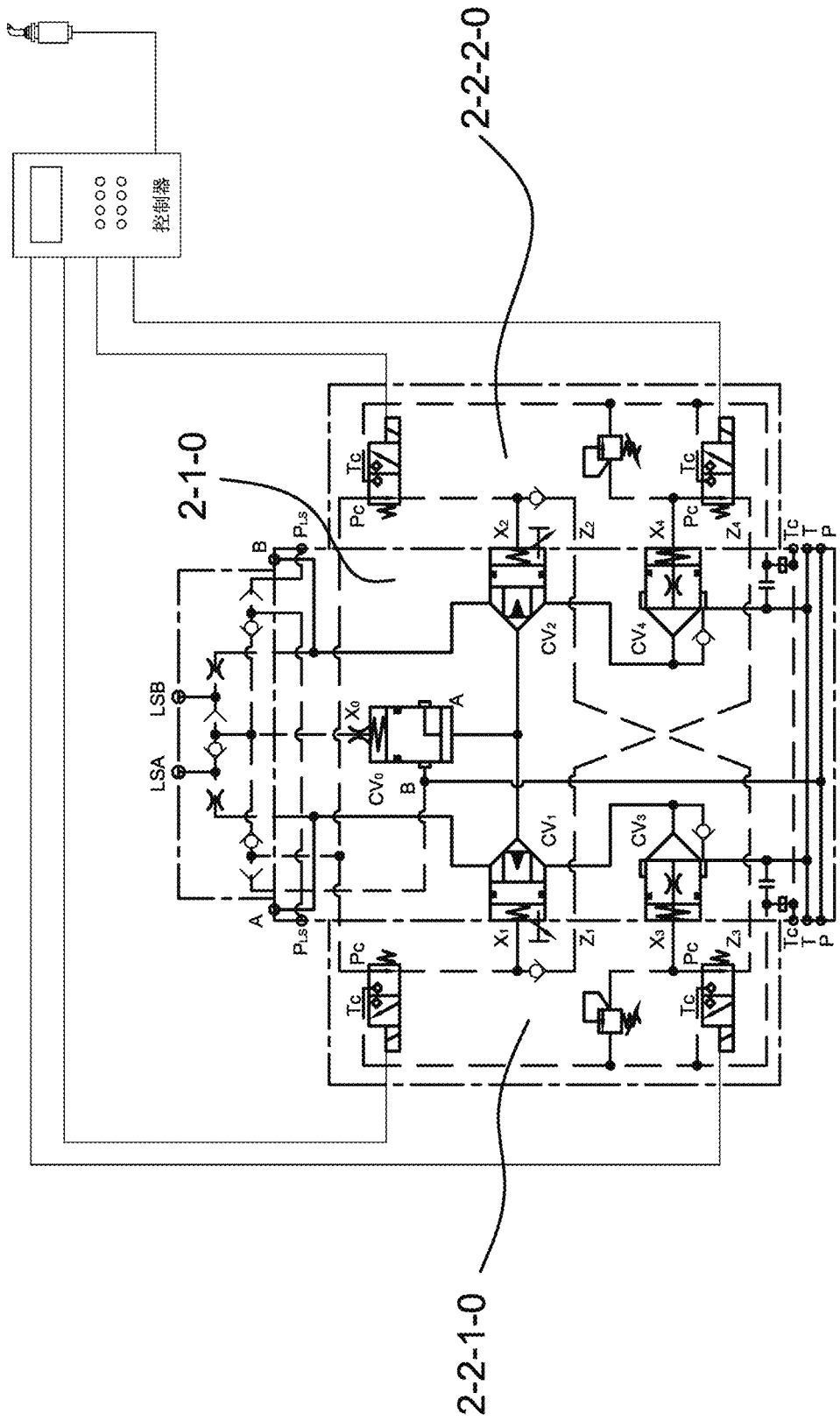
FIG. 2-3 is an exploded drawing of the electro-hydraulic multi-way valve in FIG. 2-1.

In FIG. 2-1, the innovative modular combined high-voltage electro-hydraulic valve (system) includes four modular configurable compact two-way cartridge valve seat valve main stage control assemblies CV1, CV2, CV3, CV4, which can be specially designed, a modular combined valve body (FIG. 2-1-0) with a pressure compensated assembly CV0 and four compact two-way cartridge valve mounting holes corresponding to seat valve main stage CV0-CV4, two flange control plate with multiple innovative pilot control elements. The compact two-way cartridge valve seat valve main stage control assembly and the control plate are selected and specially designed based on the requirements of pilot control systems and channels arrangements, that is selected and configured by rules according to many typical or customized control functions; the compact two-way cartridge valve mounting holes in valve body are connected and designed based on the requirements of basic power circuit in Hydraulic Resistance Theory. When using sandwich structure, seen exploded view FIG. 2-3 of the product in FIG. 2-1, there are usually two opposite inner mounting surfaces F1, F2, which has main ports P, T, auxiliary ports Pc, Tc for penetration and through holes n-Mdi for connecting bolts. The surrounding mounting surfaces F3, F4 are inner mounting surfaces, which has compact two-way cartridge valve mounting holes and flange control plate mounting surfaces. The top mounting surface F5 has two main ports A, B connected to load cavity besides mounting surfaces for flange control plate and cartridge valve. Besides the mounting holes CVH0, CVH1, CVH2, the above three mounting surfaces also can have other customized mounting surfaces if required, such as customized flange control plate mounting surfaces, locating surfaces for screw cartridge valves and kinds of countersunk hole surfaces.

Figures 2, 3:
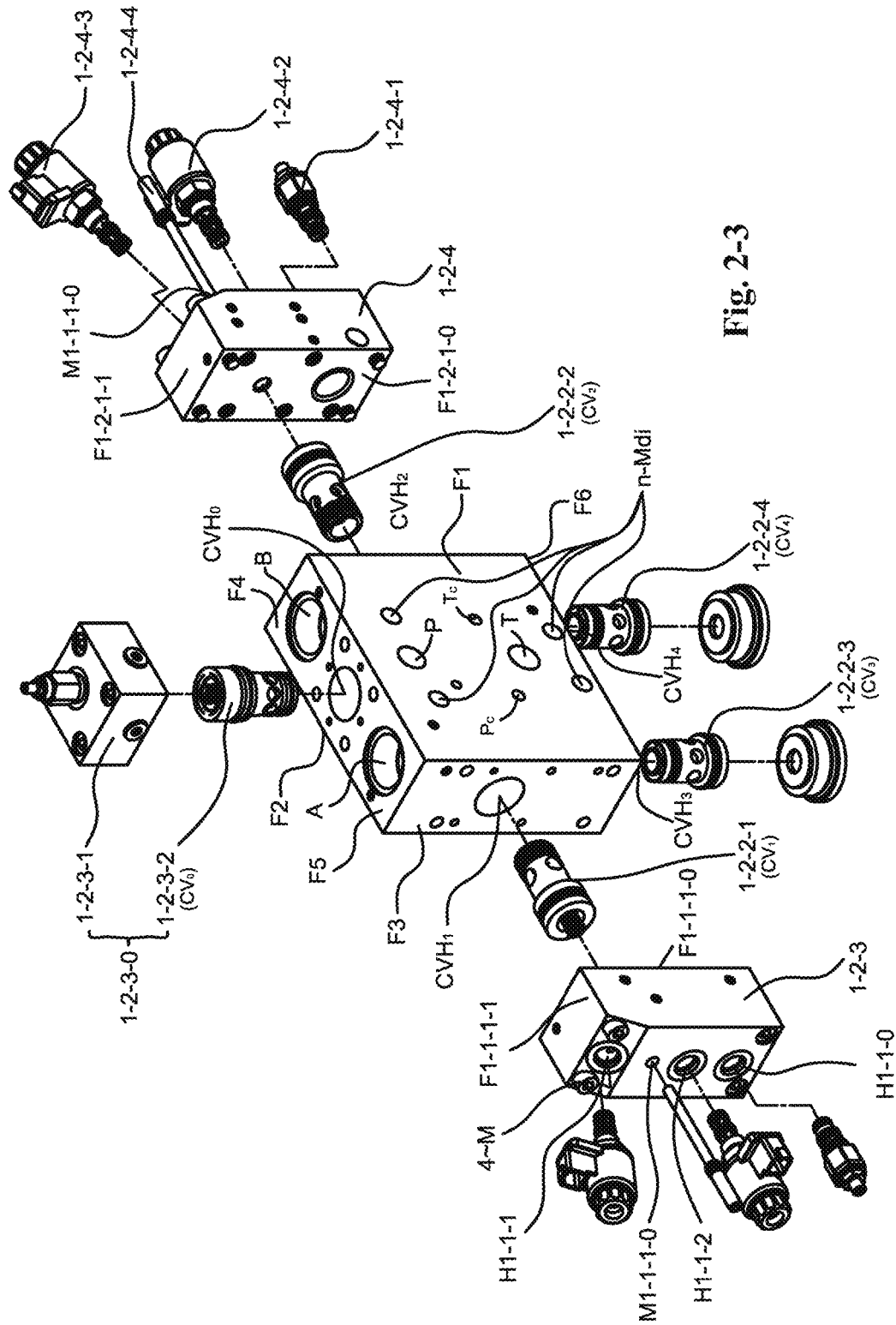

The bottom surface F6 in FIGS. 2-1 and 2-3 has mounting holes CVH3, CVH4 with connected screws, which are different from the mounting holes CVH1, CVH2, CVH0 and are specially designed.

FIG. 2-2 is the schematic of a basic sandwich modular combined electro-hydraulic multi-way valve circuit system based on the structure of FIGS. 2-1 and 2-3.

Figures 2, 3:
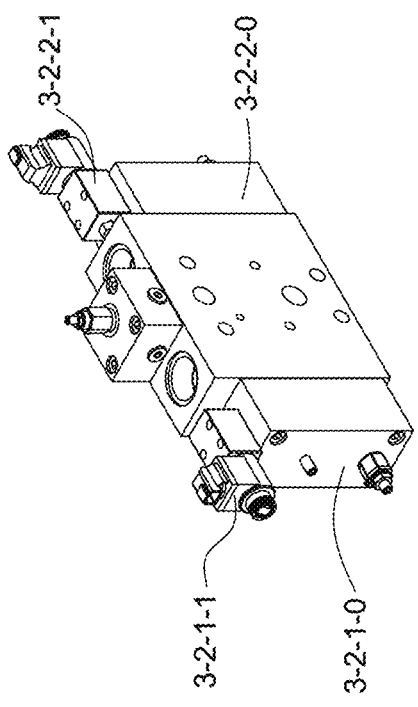
Figure 3:
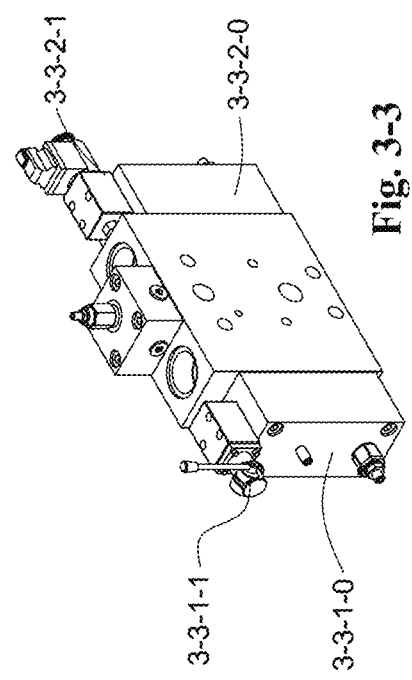
Figures 1, 3:
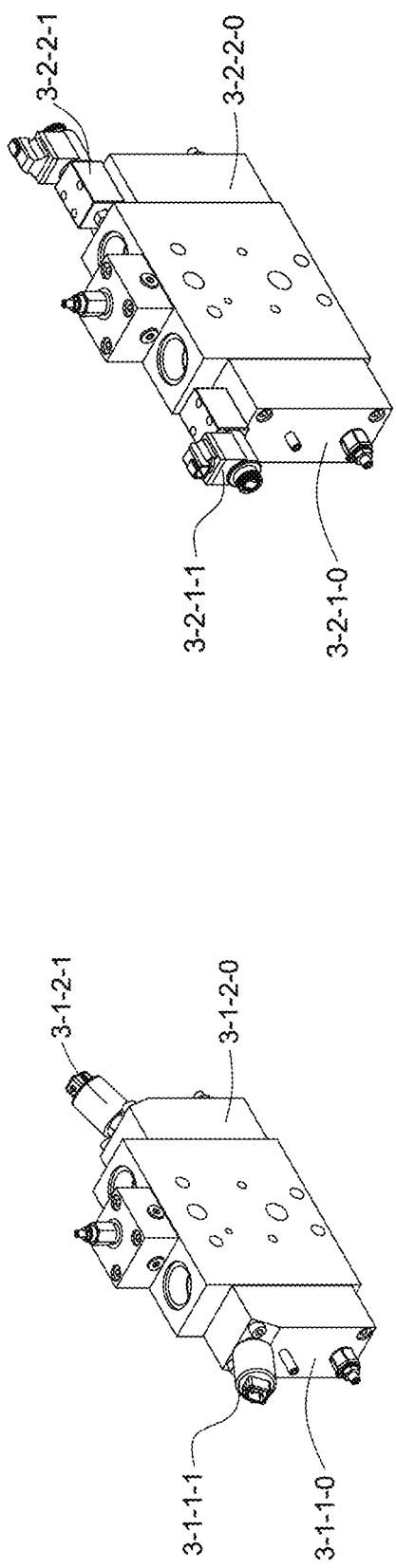
Figures 3, 4, 5:
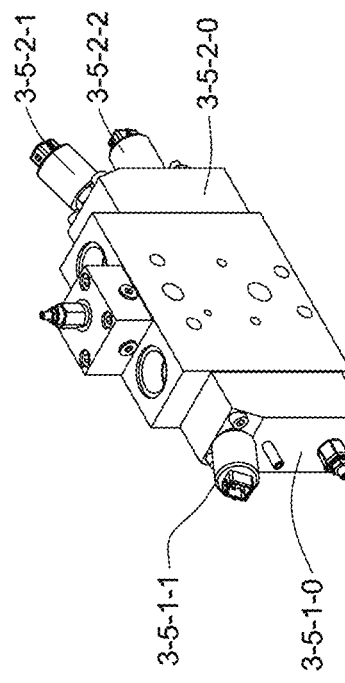
Figures 3, 4, 5, 6:
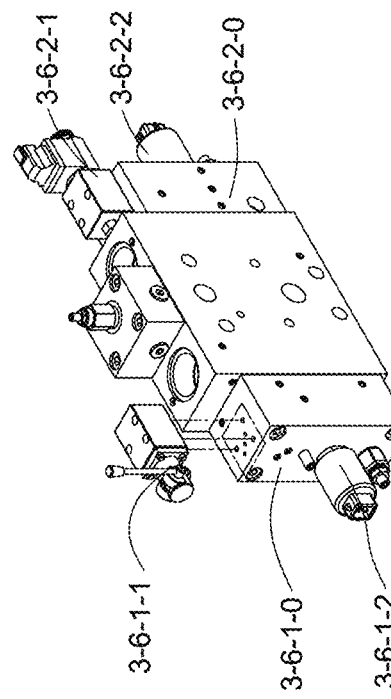
Figures 3, 4:
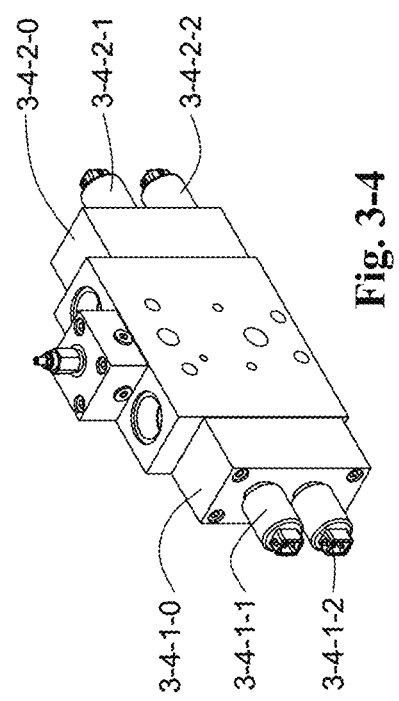
Figures 1, 4:
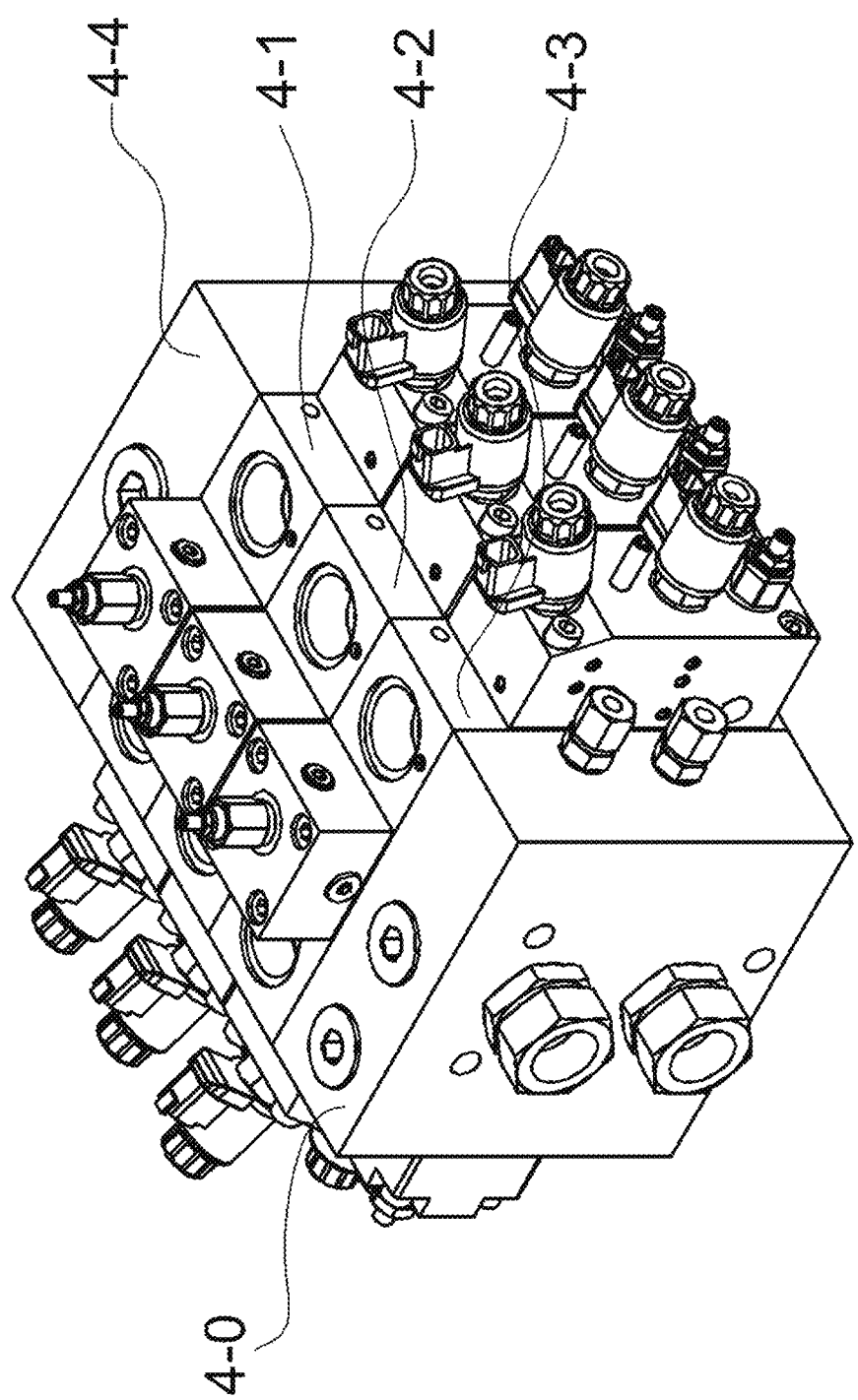
Figures 2, 4:
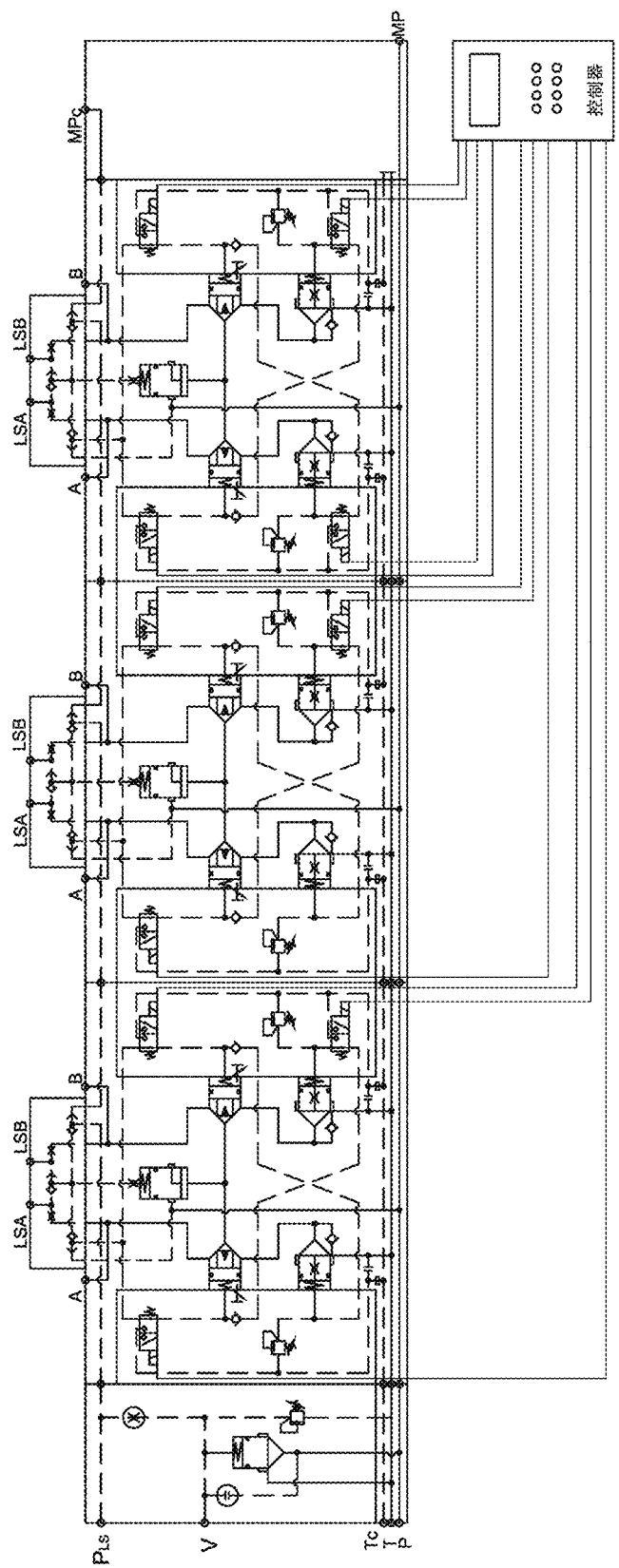
Figures 3, 4:
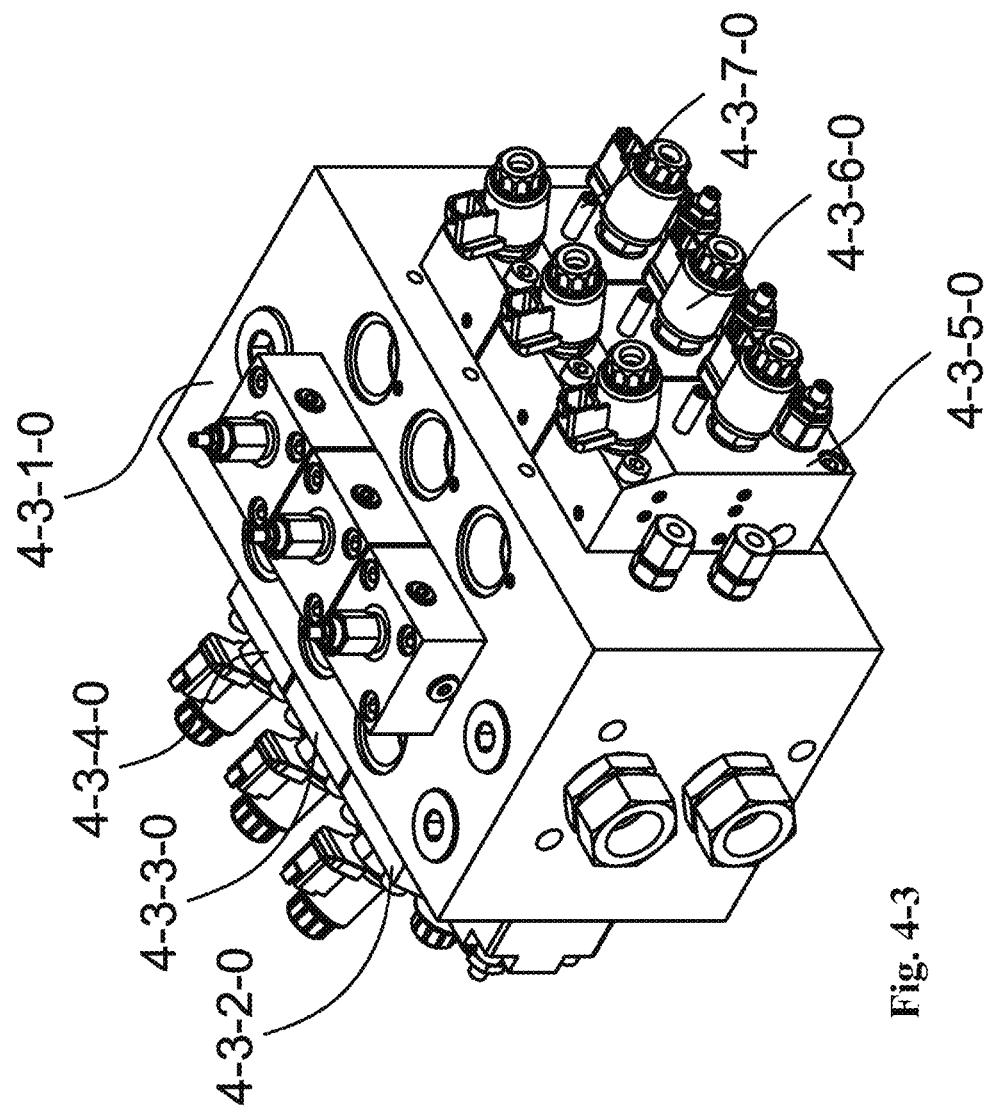
Figures 1, 5:
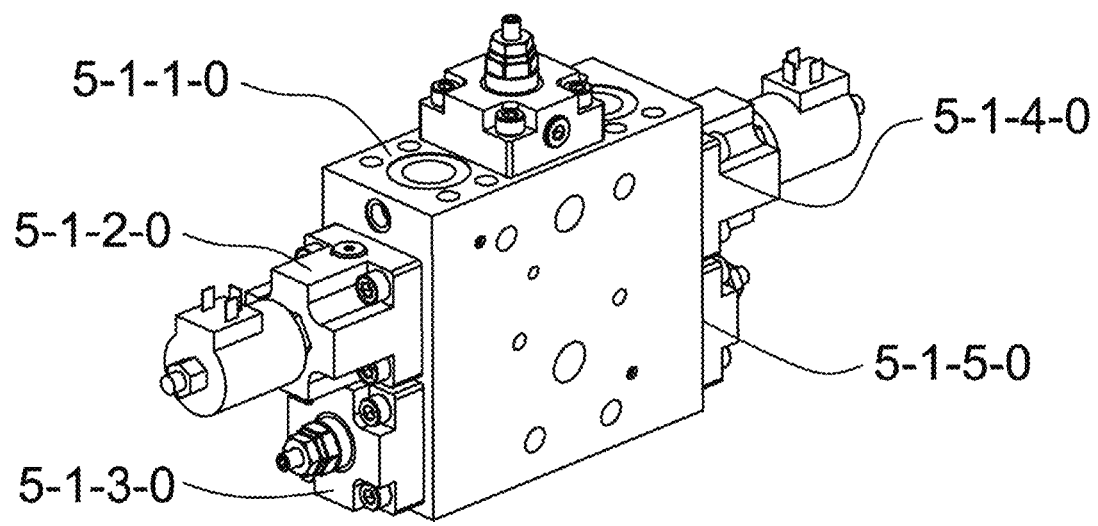
Figures 2, 5:
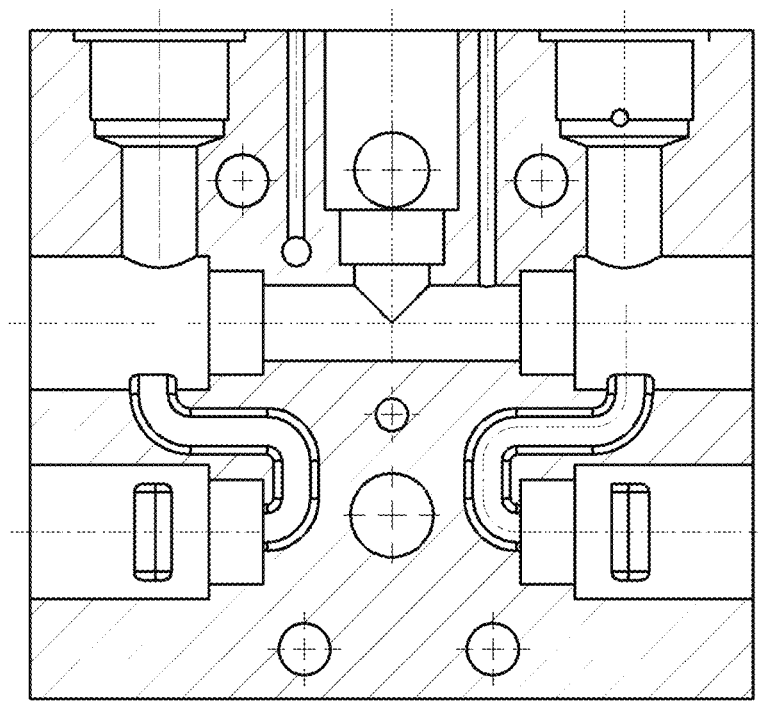
Figures 3, 5:
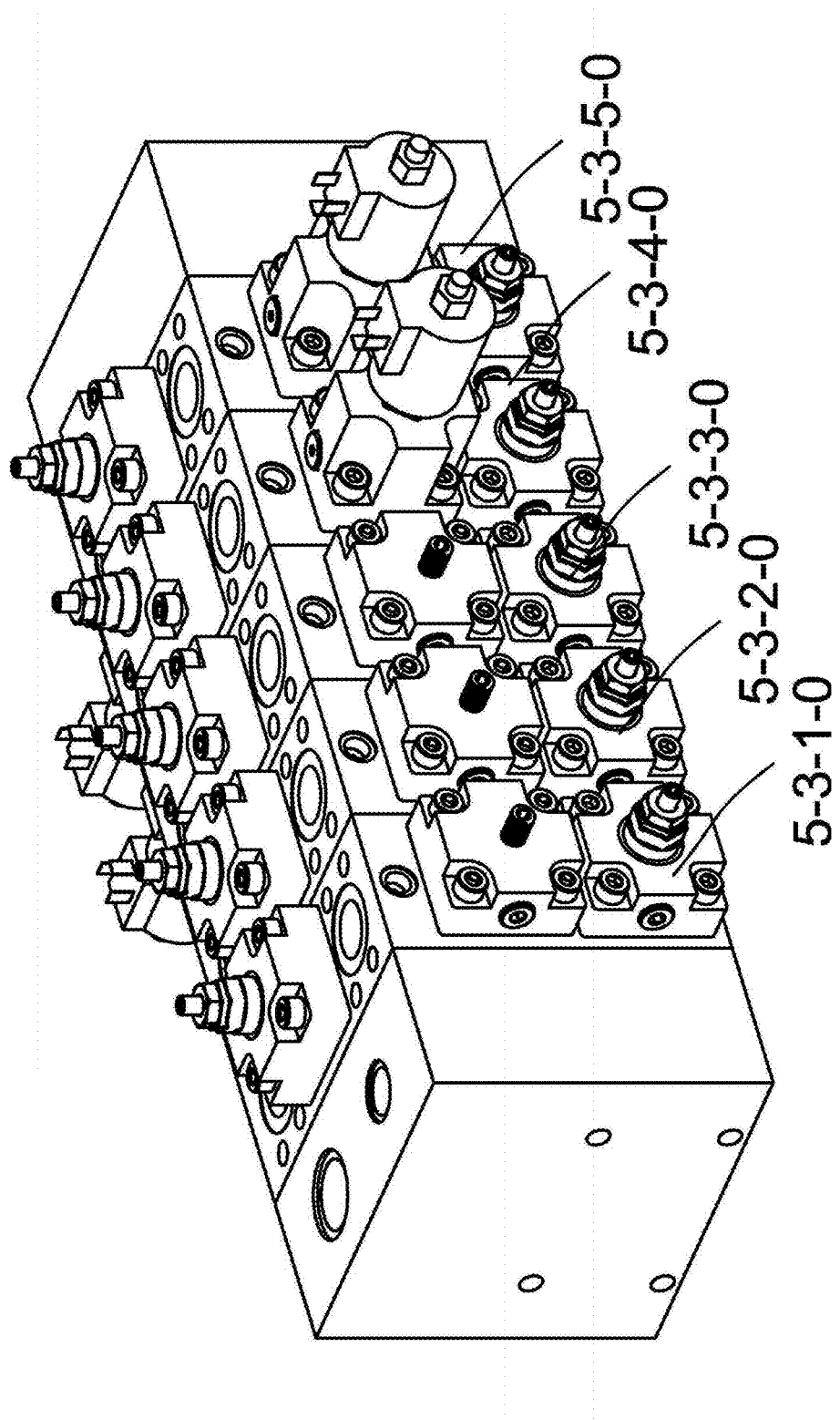

When the valve body is monoblock, the system can use the basic structure of the above reversing league or customized configurations according to the requirements. FIG. 4-3 is the outline drawing of multi-league valve bodies in the monoblock modular combined electro-hydraulic multi-way valve system using compact two-way cartridge valves, which obviously have innovative connections.

The two-way cartridge valve seat valve main stages in the present invention are preferentially control assemblies in patent products and also can be more compacter structures based on other patent control assemblies. The permutations and combinations of mounting holes in reversing league valve body for compact two-way cartridge valve assembly seat valve main stage (CV1-CV4) and pressure compensation (CV0) are usually based on the principle of "minimal fluid resistance" and "basic power circuit" in the design of combined hydraulic control circuits. It should assure that the valve body has simple and good manufacturability in the optimized arrangements. The basic electro-hydraulic multi-way valve control circuit in FIG. 2-2 has obeyed the principal of "combined hydraulic circuit design" and "basic power circuit". The circuit not only can combine kinds of functions, but also has lower pressure loss and flexible configurations.

The pilot control elements of the two-way cartridge valve seat valve main stages and pressure compensations in the present invention are preferentially kinds of compact screw pilot control valves and combined plugs using Newso holes and also can be other compact screw pilot control valves not-using Newso holes. The pilot control elements are mainly installed in the two flange control plates and the installation is based on the decomposed design principle of pilot control circuit in "hydraulic resistance theory" and "combined hydraulic circuit design". Therefore, the circuit not only can minimize the main stage control resistance of power circuit in main stage valve body, but also can realize self-supply oil and self-control pilot control. In this way, the combinations will be more flexible and compact.

The present invention has carried on product reorganizations and structural innovations substantially for traditional multi-way valve in FIG. 1 from the main structure of valve, circuit control and so on. The innovative modular combined high-voltage electro-hydraulic multi-way valve and system with the function of self-supply-oil pilot control using compact two-way cartridge valves, not only can satisfy the basic control functions and connection ways of traditional electro-hydraulic valve system, but also can satisfy the requirements of higher efficiency, energy saving, lower emission through more kinds and more reasonable modular combined configurable solutions. At the same time, it has avoided structural defect of difficult to manufacture because of complicated structure through better "manufacturability", "assemblability", "maintainability" and is good for the changing of manufacturing mode from the traditional way to the mass customized way. It will significantly and positively influence the development of mobile hydraulic control valve and combinations.

In order to easily understand the technical means, characteristics, function and effect of the present invention, now referring to drawings to explain the present invention in detail.

1. a modular combined high-voltage electro-hydraulic multi-way valve using compact two-way cartridge valve, see in FIGS. 2-1 and 2-3. Four two-way cartridge seat valve main stages CV1, CV2, CV3 and CV4, a two-way cartridge valve pressure compensation assembly CV0 and innovative valve body 2-1-0 form the main part of the electro-hydraulic multi-way valve. The main part and two side flange control plates including kinds of innovative pilot control elements and designs form the new type of sandwich modular combined high-voltage electro-hydraulic multi-way reversing league with four main ports P, T, A and B and multiple control ports Pc, Tc and auxiliary ports.

FIG. 2-2 is a schematic of electro-hydraulic multi-way valve. The new type of modular combined electro-hydraulic multi-way valve is an innovative design based on the principle of "Hydraulic resistance theory" and "basic power circuit". The way using four seat main stages to control double-acting hydraulic cylinder or hydraulic motor are according to the principle of "minimal fluid resistance" and "combined hydraulic circuit design". It can satisfy kinds of application requirements with side flange plates and their configurations and variant design. At the same time, it can satisfy the requirements of load compensations by adding cartridge valve pressure compensation control assembly.

The circuit can be electro or manually operated by computer and controller and connected by CAN 2. in FIGS. 2-1 and 2-3, the four seat valve main stages and pressure compensation assembly are installed in valve body 2-1-1 through corresponding compact seat main stages mounting holes CVH0, CVH1~CVH4. The connections between the mounting holes for seat valve main stages, main ports P, T, A, B and multiple pilot control channels, auxiliary control ports are designed and arranged based on the control requirements of main stage and pilot stage and the installed connection requirements of sandwich leagues, which are different from the commercially available electro-hydraulic multi-way valves including many traditional spool main stage and combined multi-way valve reversing leagues. The mounting holes and the specially designed channels form the unique and innovative modular combined configurable basic high-voltage electro-hydraulic multi-way valve reversing league valve body using compact seat valve main stages. At the same time, because of compact two-way cartridge valves and the principle of modular combination, the valve not only can have advantages on functions, but also on the size of shape, installation and connection, technique functions.

3. in the new type of electro-hydraulic multi-way reversing league in FIG. 2-1, the pressure compensation assembly CV0 and the mounting holes CVH0 can be two-way or three-way type and direct acting or pilot control. There can be set multiple pilot control elements and control channels in the side flange control plates to be basic pilot control combined circuit, which can be seen in FIG. 2-2. The above can form new type of sandwich electro-hydraulic multi-way valve reversing league with pressure compensation assembly. And this kind of modular combined electro-hydraulic multi-way valve reversing league can have kinds of functions.

4. the 2-2-2-0 in FIG. 2-1 actually is a modular configurable pilot control block and is used to locate and connect the four seat valve main stages in the sides of the main part of valve body in the sandwich electro-hydraulic multi-way valve reversing league. There can be set multiple innovative pilot control elements and combinations using Newso mounting holes. The elements 1-2-4-3, 1-2-4-2, 1-2-4-1 and 1-2-4-4 can control the four seat valve main stages all or separately including electro-hydraulic, electro-hydraulic proportional and manually operated by kinds of flexible pilot control circuits. So the combined circuits form unique modular combined configurable plated connected innovative side flange control plates with kinds of functions.

5. the valve body 2-1-1 in FIGS. 2-1 and 2-3 can be a unique hexahedron or complicated polyhedron. The valve body can prior be made through casting process and machining, also can be high strength cast iron material or made through forging, extrusion, rolling process and machining. The inner mounting holes are all required to machining when the valve body is made through casting process. Besides the mounting holes, the inner channels are all required to machining when the valve body is other material. The layout of mounting holes in valve body is based on "decomposed design principle" and "hydraulic resistance theory". The connections between casting and machining channels are unique and optimized, which have better manufacturability than the traditional multi-way valve products. The channels for pilot control in valve body are also unique and optimized. The valve body of the new type electro-hydraulic multi-way valve reversing league can be variant designed based on the requirements of control and configurations, which will have multiple basic or extended structure while sharing the rough.

6. the side flange control plates 2-2-1-1, 2-2-2-1 in FIGS. 2-1 can be a unique hexahedron or polyhedron. The valve body can be made through casting, forging or other roughs and then machining. The preset four or more bolt holes in the flange control plate body are used to connect and seal the two sides mounting surfaces of the valve body through inner hexagon fastening bolts. The side flange control plates are used to connect and fix and seal the side seat valve main stages in the upper of the valve body. There can be preset multiple mounting holes for screw pilot control valves, which can be the innovative Newso mounting holes, such as H1-1-0-H1-1-1 in FIG. 2-3 or standard plated mounting surface according to ISO4401-02 or CETOP-02. There are multiple pilot control channels and unique auxiliary structures, such as combined plugs, in the flange control plate body. There can be mounting holes for pilot control elements used to control the two seat valve main stages in the bottom of the valve body and corresponding channels, which are in parallel with the side surface of the valve body in the lower of the plate body. The lower mounting holes and corresponding channels form the unique modular combined side flange control plate body, which can have many variant designs and multiple basic or extended structures.

7. the innovative sandwich electro-hydraulic multi-way valve reversing league in FIG. 3-1 is characterized by that, the main part of reversing league is a basic body, two side flange control plate bodies 3-1-1-0, 3-1-2-0 are a basic combination of flange control plates. The above basic configuration forms 4/4 electro-hydraulic reversing league with pressure compensation control. The upper of two side flange control plates are symmetrical. The compact innovative 2/3 pilot solenoid valve 3-1-1-1, 3-1-2-1 using screw mounting holes including the Newso mounting holes is installed at a certain angle in the upper of the flange control plate, which can be spool or seat valve type. The new type of pilot control valve based on Newso mounting holes not only has good control functions, but also has smaller body. So it is good for the compact of the main part of the combined electro-hydraulic multi-way valve reversing league.

8. a innovative sandwich electro-hydraulic multi-way valve reversing league using basic valve body in FIG. 3-2, is characterized by that, the main part of reversing league is a basic body, two side flange control plate bodies 3-2-1-0, 3-2-2-0 are a basic combination of flange control plates. The above basic configuration forms 4/4 electro-hydraulic reversing league with pressure compensation control. The upper of the two side flange control plate are specially set as standard mounting surface according to ISO4401-02 and CETOP-02. There can be set one or two symmetrical innovative plated connected 2/4 pilot control valves 3-2-1-1, 3-2-2-1 in the mounting surface. So the main part of reversing league and two side flange control plates form 4-way electro-hydraulic multi-way valve reversing league with 2/4 and 4/4 functions.

9. a innovative sandwich electro-hydraulic multi-way valve reversing league using basic valve body, is characterized by that, the main part of reversing league is a basic body, two side flange control plate bodies 3-3-1-0, 3-3-2-0, 3-6-1-0, 3-6-2-0 are a basic combination of flange control plates. There can be preset standard mounting surface according to ISO 4401-02 and CETOP-02 and can install manual control type plated connected 3/4 control valve 3-3-1-1 in FIG. 3-3 in the left or right side flange control plate. The manual control type valve and the other side simple configurable flange control plate form 3/4 electro-hydraulic multi-way valve reversing league with manual control and 3/4 functions. When the above manual control type valve changed to innovative plated connected 3/4 pilot solenoid valve, the combination will form 3/4 electro-hydraulic multi-way valve reversing league with 3/4 functions corresponding to kinds of pilot stages.

10. a innovative sandwich electro-hydraulic multi-way valve reversing league using basic valve body with proportional throttle and proportional pressure control functions, is characterized by that the seat valve main stages in the main part of reversing league are proportional control seat valve main stages, the two side flange control plate body can both have pilot control stage and corresponding structures or can have other structures according to the control requirements separately. The two upper "inlet resistance" seat valve main stage connected with main port P and executive structure ports A, B and the preset corresponding structure in the upper of the two side configurable flange control plate can construct the outlet ports A, B with proportional flow output functions both or separately and form innovative "inlet resistance" proportional control assembly. The 3-4-1-1, 3-4-2-1 is proportional flow control solenoid and pilot control assembly. The two lower "return oil resistance" seat valve main stage connected with main port T and executive structure ports A, B and the preset corresponding structure in the lower of the two side configurable flange control plate can construct the oil return ports A, B with pressure proportional control functions separately. The 3-4-1-2, 3-4-2-2 is proportional pressure control solenoid and pilot control assembly.

The unique and innovative proportional control multi-way reversing league in FIG. 3-4 is different from the traditional multi-way valve. As a single control structure, the valve can separately proportional control flow and pressure for the four main ports P according to actual requirements.

11. an innovative sandwich electro-hydraulic multi-way valve reversing league using basic valve body with differential control and flow regeneration functions is characterized by that, the two side flange control plates 3-5-1-0, 3-5-2-0 in FIG. 3-5 are configurable flange control plates. In the configurable control plates there added one or two 2/3 or 2/4 pilot solenoid valve elements 3-5-2-2 using Newso mounting holes and control channels, which can separately by passing type control the near seat valve main stage. The valve can form new type electro-hydraulic multi-way valve reversing league with differential control and flow regeneration functions. The principle can be seen in FIG. 2-2. It just needs a few changes then can realize differential control and flow regeneration functions. It does not need to add new elements.

12. an innovative sandwich electro-hydraulic multi-way valve reversing league using basic valve body with A, B ports self-supply-oil functions is characterized by that, the lower seat valve main stages in the main part of reversing league connected A, B ports and main port T can be with second-supply-oil functions, which can be seen seat valve main stages CV3, CV4 in FIG. 2-2.

13. a new type of sandwich electro-hydraulic multi-way valve reversing league system, which has configured input leagues 4-0, output leagues 4-4, middle leagues and special leagues 4-1, 4-2 and 4-3 in FIG. 4-1. The system can be electro or remote controlled by kinds of standard or special controller including CAN and PLC according to different control requirements.

14. a monoblock electro-hydraulic multi-way valve system using casting or forging material can form innovative monoblock electro-hydraulic multi-way valve 4-3-1-0 in FIG. 4-3. The modular combined high-voltage electro-hydraulic multi-way valve system has the same cartridge valves and side flange control plates 4-3-2-0-4-3-7-0 as other modular combined electro-hydraulic multi-way valve except the valve body.

15. an innovative sandwich electro-hydraulic multi-way reversing league, is characterized by that, the valve body 5-1-1-0 is the hexahedron or polyhedron structure after casting and machining process, the four seat valve main stages and the corresponding mounting holes in the valve body can be the compact two-way cartridge valve control assembly and the corresponding mounting holes, the axes of the same side two seat valve main stages are parallel. The side flange control plates can be combined flange control plates and the variant design 5-1-2-0~5-1-5-0 corresponding to each compact two-way cartridge valve seat valve main stages separately. The above structure can form another new type of modular combined electro-hydraulic multi-way valve reversing league using innovative compact two-way cartridge valve seat valve main stages. The combinations and configurations of this new type of sandwich electro-hydraulic multi-way valve reversing league are similar to other reversing leagues in this present invention and can have kinds of designs and possibilities. The valve body of electro-hydraulic multi-way valve reversing league is casting iron material using casting process. The valve body and the channels in the valve body are all using casting process. The mounting holes for seat valve main stages and the arrangement of the channels are safe and unique.

16. the new type of sandwich electro-hydraulic multi-way reversing league 5-3-1-0~5-3-5-0 in FIG. 5-1 can form kinds of sandwich connected system league according to different control requirements of different mobile machines in FIG. 5-3.

The present modular combined electro-hydraulic multi-way valve system can widely used in kinds of mobile machines and equipments, such as hoisting machinery and equipment, concrete machinery, mining machinery, marine heavy industry equipments and so on.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

The invention claimed is:

1. An electro-hydraulic multi-way reversing league including one or more main stage valves, each main stage valve comprising:
    a valve body that includes one or more mounting holes;
    one or more compact two-way cartridge valves connected to the mounting holes on the valve body;
    one or more flange control plates that are connected to the valve body via one or more of the compact two-way cartridge valves, to control oil supplied to the main stage valve, the one or more flange control plates including one or more pilot solenoid valve screw mounting holes that are disposed at an angle that is not parallel to the valve body, in a horizontal direction nor in a vertical direction; and
    a cartridge pressure compensation control assembly connected to the valve body via the one or more mounting holes on the valve body, to control load compensation.

2. The electro-hydraulic multi-way reversing league according to claim 1, wherein the pressure compensation assembly in the main part is two-way or three-way type and is direct acting or pilot control.

3. The new type electro-hydraulic multi-way reversing league according to claim 1, wherein the pressure compensation assembly is a direct acting type.

4. The electro-hydraulic multi-way reversing league according to claim 1, wherein the pressure compensation assembly is a pilot control type.

5. The electro-hydraulic multi-way reversing league according to claim 1, wherein the pressure compensation assembly is a compact two-way cartridge valve pressure compensation assembly with combined flange control plate.

6. The electro-hydraulic multi-way reversing league according to claim 1, wherein the pressure compensation assembly includes screw cartridge valve mounting holes.

7. The electro-hydraulic multi-way reversing league according to claim 1, wherein pilot control elements and ports control pressure compensation in the one or more flange control plates.

8. The electro-hydraulic multi-way reversing league according to claim 1, wherein 2/4 pilot control valves are set on a mounting surface of the one or more flange control plates.

9. The electro-hydraulic multi-way reversing league according to claim 1, wherein one 3/4 control valve is set on a mounting surface of a left or right side of the one or more flange control plates.

10. The electro-hydraulic multi-way reversing league according to claim 1 wherein the main stage is a proportional control seat valve main stage, and the one or more flange control plates include a pilot control stage corresponding to the proportional control seat valve main stage.

11. The electro-hydraulic multi-way reversing league according to claim 1, wherein the one or more flange control plates are configurable flange control plates that include pilot solenoid valve elements and control ports.

12. The electro-hydraulic multi-way reversing league according to claim 1, wherein axes of the each of the main stages are parallel to each other.

13. The electro-hydraulic multi-way reversing league according to claim 1 wherein the valve body and the mounting holes are formed from a casting process.

14. An electro-hydraulic multi-way reversing league system including:
    one or more of the electro-hydraulic multi-way reversing leagues as claimed in claim 1,
    wherein the one or more of the electro-hydraulic multi-way reversing leagues are connected to each other side-by-side.

15. The electro-hydraulic multi-way reversing league according to claim 8, wherein the one or more flange control plates are configurable flange control plates that include pilot solenoid valve elements and control ports.

16. The electro-hydraulic multi-way reversing league according to claim 9, wherein the one or more flange control plates are configurable flange control plates that include solenoid valve elements and control ports.

* * * * *